United States Patent
Solan et al.

(10) Patent No.: US 9,286,052 B1
(45) Date of Patent: Mar. 15, 2016

(54) UPGRADING SOFTWARE ON A PAIR OF NODES IN A CLUSTERED ENVIRONMENT

(75) Inventors: Alex Solan, Hertzliya (IL); Assaf Natanzon, Tel Aviv (IL); Saar Cohen, Moshav Mishmeret (IL); Jehuda Shemer, Kfar Saba (IL)

(73) Assignee: EMC Corporation, Hopkinton, MA (US)

( * ) Notice: Subject to any disclaimer, the term of this patent is extended or adjusted under 35 U.S.C. 154(b) by 574 days.

(21) Appl. No.: 13/233,155

(22) Filed: Sep. 15, 2011

(51) Int. Cl.
*G06F 9/44* (2006.01)
*G06F 9/445* (2006.01)

(52) U.S. Cl.
CPC ... *G06F 8/65* (2013.01); *G06F 8/60* (2013.01); *G06F 8/61* (2013.01)

(58) Field of Classification Search
CPC .............. G06F 8/60; G06F 8/61; G06F 8/65; G06F 8/70
USPC .................................................. 717/168–173
See application file for complete search history.

(56) References Cited

U.S. PATENT DOCUMENTS

| | | | |
|---|---|---|---|
| 6,212,557 B1 * | 4/2001 | Oran | G06F 9/465 709/220 |
| 6,892,316 B2 * | 5/2005 | Eide | H04L 41/0803 714/3 |
| 7,203,741 B2 | 4/2007 | Marco et al. | |
| 7,206,910 B2 * | 4/2007 | Chang | G06F 9/465 711/145 |
| 7,260,818 B1 * | 8/2007 | Iterum | G06F 8/71 717/102 |
| 7,360,208 B2 * | 4/2008 | Joshi | G06F 8/65 709/220 |
| 7,719,443 B1 | 5/2010 | Natanzon | |
| 7,840,536 B1 | 11/2010 | Ahal et al. | |
| 7,840,662 B1 * | 11/2010 | Natanzon | ....................... 709/223 |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |

(Continued)

OTHER PUBLICATIONS

Webopedia, "What is Sleep Mode?" Feb. 1, 2001, last retrieved from http://www.webopedia.com/TERM/S/sleep_mode.html on Aug. 20, 2015.*

*Primary Examiner* — Wei Zhen
*Assistant Examiner* — Andrew M Lyons
(74) *Attorney, Agent, or Firm* — Daly, Crowley, Mofford & Durkee, LLP

(57) ABSTRACT

In one aspect, a method to upgrade software on nodes in a clustered environment, includes terminating processes on a first node before upgrading the software on the first node, upgrading the software to a first version from a second version on the first node, running the processes on the first node after upgrading the software on the first node to the first version, determining whether a second node is about to upgrade to the first version of software, allowing transfer of site control from the second node to the first node, if the second node is about to upgrade to the first version of software and upgrading the software on the second node to the first version of software after the transferring of site control from the second node to the first node.

16 Claims, 3 Drawing Sheets

(56) References Cited

U.S. PATENT DOCUMENTS

| | | |
|---|---|---|
| 8,271,441 B1 | 9/2012 | Natanzon et al. |
| 8,271,447 B1 | 9/2012 | Natanzon et al. |
| 8,326,800 B2 * | 12/2012 | Cunningham .... G06F 17/30578 707/610 |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,498,967 B1 * | 7/2013 | Chatterjee et al. ............ 707/674 |
| 8,510,279 B1 | 8/2013 | Natanzon et al. |
| 8,521,691 B1 | 8/2013 | Natanzon |
| 8,521,694 B1 | 8/2013 | Natanzon |
| 8,521,853 B2 * | 8/2013 | Rathunde et al. ............. 709/221 |
| 8,543,609 B1 | 9/2013 | Natanzon |
| 8,583,885 B1 | 11/2013 | Natanzon |
| 8,589,535 B2 * | 11/2013 | Calder ..................... G06F 8/65 709/221 |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,712,974 B2 * | 4/2014 | Datuashvili ....... G06F 17/30156 707/610 |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 2007/0074201 A1 * | 3/2007 | Lee .............................. 717/173 |
| 2009/0144720 A1 * | 6/2009 | Roush ...................... G06F 8/65 717/171 |
| 2009/0313630 A1 * | 12/2009 | Hori .......................... G06F 8/67 718/102 |
| 2010/0042869 A1 * | 2/2010 | Szabo et al. ...................... 714/4 |
| 2010/0162226 A1 * | 6/2010 | Borissov .................. G06F 8/67 717/173 |
| 2011/0161949 A1 * | 6/2011 | Kodaka ...................... G06F 8/67 717/168 |
| 2013/0031403 A1 * | 1/2013 | Mordani ................ H04L 67/28 714/4.11 |

* cited by examiner

UPGRADING SOFTWARE ON A PAIR OF NODES IN A CLUSTERED ENVIRONMENT

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY

In one aspect, a method to upgrade software on nodes in a clustered environment, includes terminating processes on a first node before upgrading the software on the first node, upgrading the software to a first version from a second version on the first node, running the processes on the first node after upgrading the software on the first node to the first version, determining whether a second node is about to upgrade to the first version of software, allowing transfer of site control from the second node to the first node, if the second node is about to upgrade to the first version of software and upgrading the software on the second node to the first version of software after the transferring of site control from the second node to the first node.

In another aspect, an article includes a non-transitory machine-readable medium that stores executable instructions to upgrade software on nodes in a clustered environment. The instructions causing a machine to terminate processes on a first node before upgrading the software on the first node, upgrade the software to a first version from a second version on the first node, run the processes on the first node after upgrading the software on the first node to the first version, determine whether a second node is about to upgrade to the first version of software, transfer site control from the second node to the first node, if the second node is about to upgrade to the first version of software and upgrade the software on the second node to the first version of software after the transfer of site control from the second node to the first node.

In a further aspect, a first node includes circuitry configured to terminate processes on a first node before upgrading the software on the first node, upgrade the software to a first version from a second version on the first node, run the processes on the first node after upgrading the software on the first node to the first version, determine whether a second node is about to upgrade to the first version of software and be allowed to receive site control, if the second node is about to upgrade to the first version of software.

DETAILED DESCRIPTION

Described herein is an approach to upgrade software on nodes. In particular, the methods and techniques described herein allow for two nodes to use the same software upgrade process independently from each other while allowing only one of the nodes to have site control at a time. In one example, a node can crash in the middle of an upgrade, recover and continue upgrading seamlessly. While the description describes one particular pair of nodes as being data protection appliances (DPAs), the nodes may be any nodes in a clustered computing environment where one of the nodes is determined as site control. As used herein, site control is a determination of one and only one of the nodes as the controller of all other nodes in a system (e.g., a site). While the manner of selecting the site control and the responsibilities assumed by it are determined by a leader election protocol not described herein, more than one site control is strictly prohibited; however, the system can function for brief periods of time without a site control.

Figure 1:
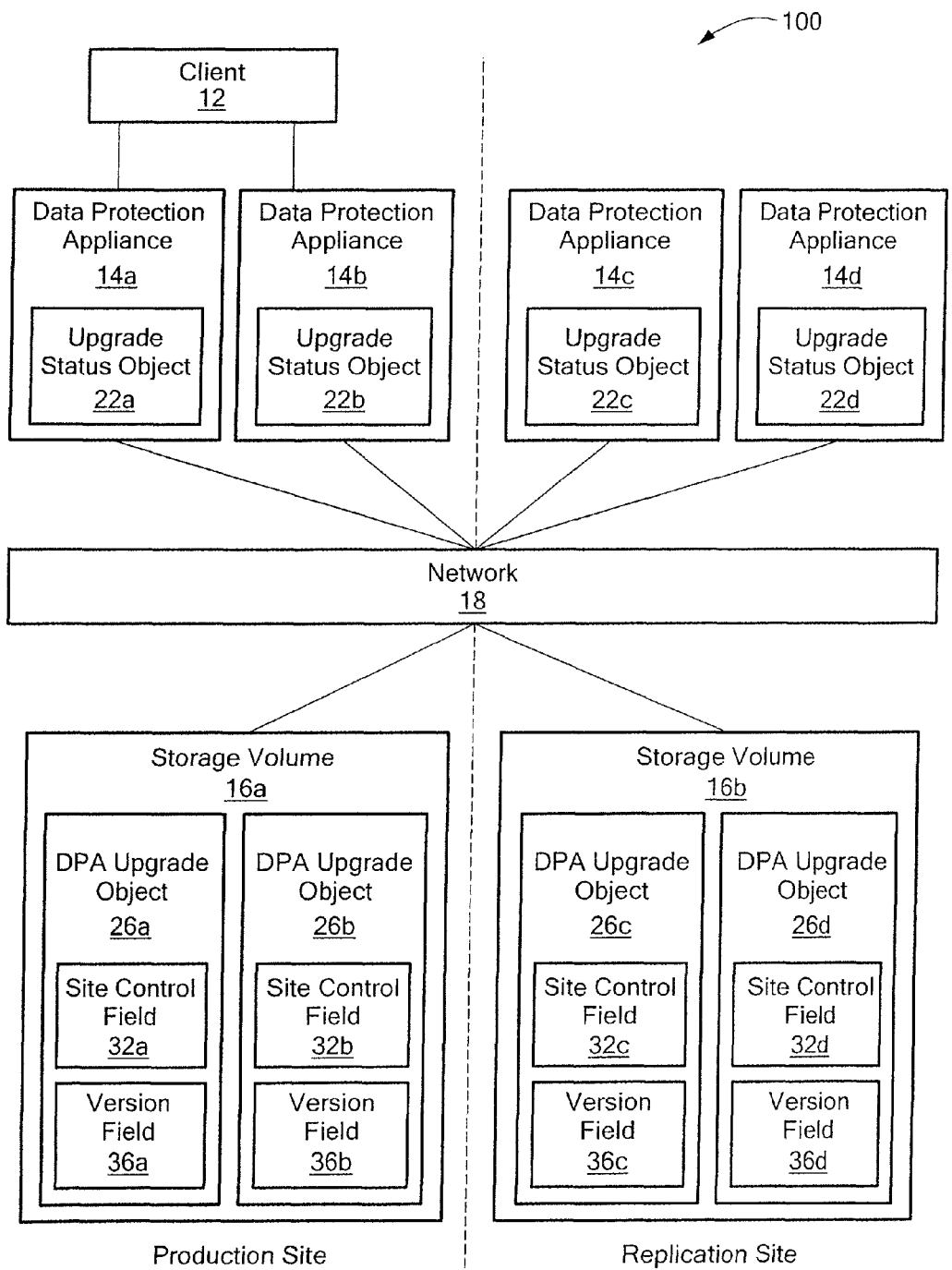
FIG. 1 is a block diagram of an example of a data protection system.

Referring to FIG. 1, a data protection system 100 includes a client 12, data protection appliances (DPAs) (e.g., a DPA 14a and a DPA 14b) and a storage volume 16a at a production site and data protection appliances (DPAs) (e.g., a DPA 14c and a DPA 14d) and a storage volume 16b at a replication site. The DPAs 14a-14d and the storage volumes 16a-16b are coupled together through the network 18. In one example, the network 18 may be a network such as a wide area network (WAN).

The DPAs 14a, 14b are redundant in case of failure so that one of the DPAs 14a, 14b controls the production site (i.e., has site control) at a time. Likewise, the DPAs 14c, 14d are redundant in case of failure so that one of the DPAs 14c, 14d controls the replication site at a time. The DPA 14c, 14d are also redundant to the DPAs 14a-14b, in the event the production site fails.

Each of the DPAs 14a-14d includes an upgrade status object. For example, the DPA 14a includes an upgrade status object 22a, the DPA 14b includes an upgrade status object 22b, the DPA 14c includes an upgrade status object 22c and the DPA 14d includes an upgrade status object 22d. The upgrade status objects 22a-22d indicate whether a software update is in progress for the respective DPA 14a, 14b. In one example, the upgrade status object 22a, 22b is a persistent bit that is not removed or copied over during a software upgrade of the respective DPA 14a-14d. In one particular example, if the upgrade status object 22a-22d is set to "True" no processes on the respective DPA 14a-14d will run when a script is executed to run all processes on the DPA. For example, the DPA 14a-14d will not be automatically or manually run whether it be processes/services/daemons/webservers and so forth.

In one example, the upgrade status objects 22a-22d may be used in the event of a crash during upgrade so that their respective DPA 14a-14d can recognize its previous state prior to the crash.

The storage volume 16a includes a DPA upgrade object 26a and a DPA upgrade object 26b. The DPA upgrade object 26a is updated by the DPA 14a and the DPA upgrade object 26b is updated by the DPA 14b. The DPA 14a can read or access the DPA upgrade object 26b but it cannot write to it. Likewise, the DPA 14b can read or access the DPA upgrade object 26a but it cannot write to it.

Similarly, the storage volume 16b includes a DPA upgrade object 26c and a DPA upgrade object 26d. The DPA upgrade object 26c is updated by the DPA 14c and the DPA upgrade object 26d is updated by the DPA 14d. The DPA 14c can read or access the DPA upgrade object 26d but it cannot write to it. Likewise, the DPA 14d can read or access the DPA upgrade object 26c but it cannot write to it.

The DPA upgrade objects 26a-26d include two fields. For example, the DPA upgrade object 26a includes a site control field 32a and a version field 36a, the DPA upgrade object 26b includes a site control field 32b and a version field 36b, the DPA upgrade object 26c includes a site control field 32c and a version field 36c and the DPA upgrade object 26d includes a site control field 32d and a version field 36d.

The site control field 32a-32d indicates whether the respective DPA 14a-14d can take over site control. In one example, a "True" in the site control field 32a-32d indicates that the DPA can take over site control while a "False" in the site control field 32a-32d indicates that the DPA cannot take over site control. The version field 36a-36d indicates what version of software is on or is about to be on the respective DPA 14a-14d.

Figure 2:
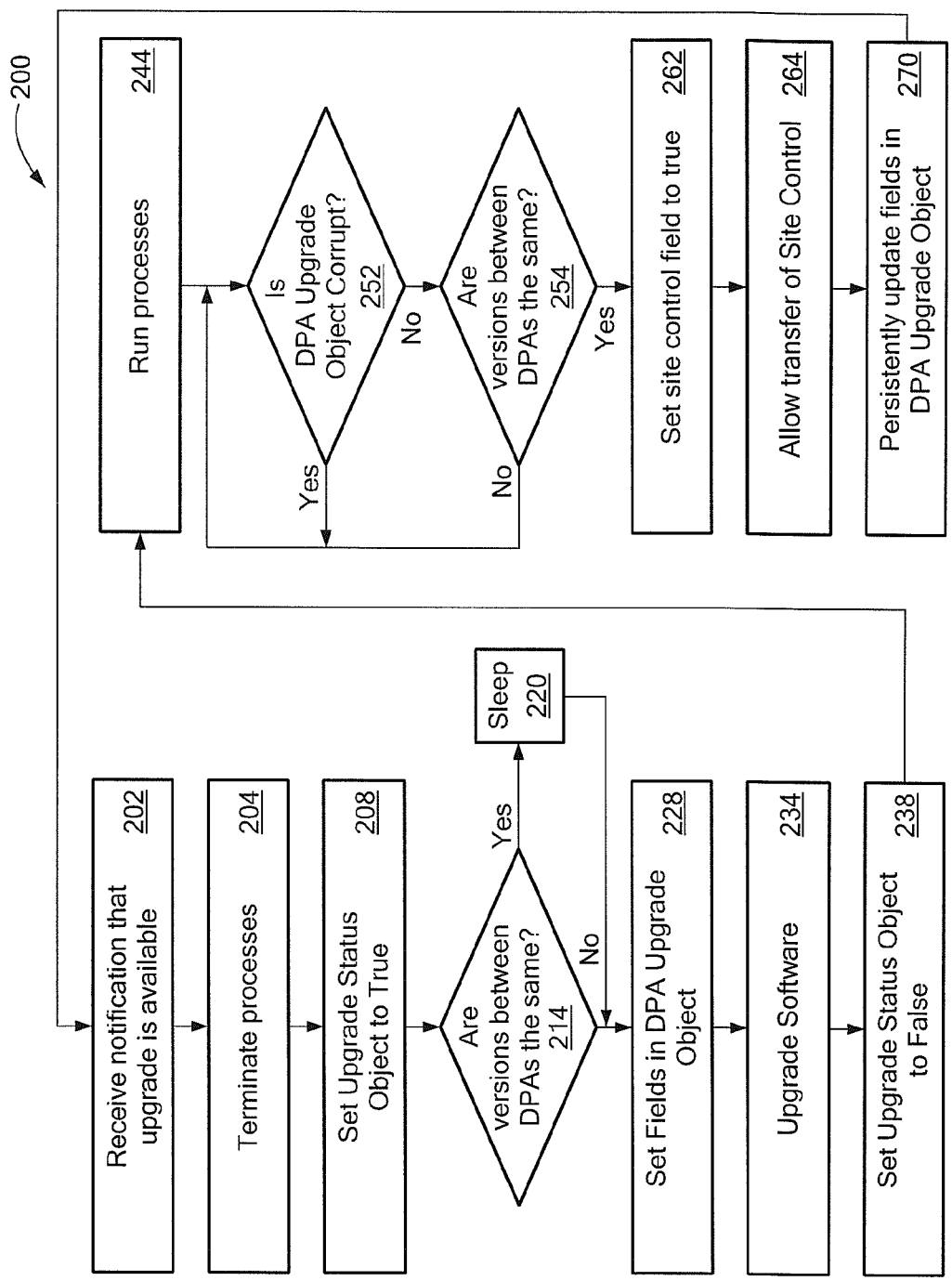
FIG. 2 is a flowchart of an example of a process to upgrade software on a data protection appliance (DPA).

Referring to FIG. 2, an example of a process to upgrade software on data protection appliance (DPAs) is a process 200. In particular, each DPA 14a, 14b can execute the process 200 independently of each other to upgrade software from a version "n" to a version "n+1". While the example below is a description of the process 200 executing on the production site DPAs 14a-14b, the process 200 can also be executed on the replication site DPAs 14c-14d. While the examples herein describe going from version "n" to "n+1", other examples may include going from version "n" to "n−1" in situations where the "n" version is not working properly and reverting back to an older version is required. Still further examples can include upgrade of software to any different version of software.

The following is an example of process 200 executing on the DPA 14a first before executing on the DPA 14b. Process 200 receives notification that a new software version (n+1) is available (202) and terminates the processes running on the DPA (204) and sets the upgrade status object 22a to "True" (208). Process 200 determines if the software version for the DPA 14a is the same as the software version for the DPA 14b (214). For example, the DPA 14a reads the version field 36b in the DPA upgrade object 26b to determine the version of software on or is about to be put on the DPA 14b. If the software version for the DPA 14a is the same as the software version for the DPA 14b, the process 200 sleeps for a predetermined time (220). For example, the DPA 14a sleeps for 30 seconds. By allowing the DPA 14a to sleep, the DPA 14b can take over site control from the DPA 14a if the DPA 14a has site control. In other examples, alternatively to sleep, if the current node is running site control it can electively relinquish control to another node if such a mechanism exists (e.g., using a push mechanism instead of pull mechanism). Using a sleep mechanism is one example to minimize the time in which the system is without Site Control. System 10 can function for a while without site control; however, this is costly so that reducing the time that there is no site control is desired.

Process 200 sets the fields in the DPA upgrade object 26a (228). For example, the DPA 14a sets the site control field to False and the version field from "n" to "n+1."

Process 200 upgrades the software on the DPA 14a (234) and sets the upgrade status object 22a to False from True (238). Process 200 runs the processes on the DPA 14a (244). For example, the DPA 14a runs a script that runs all the processes on the DPA 14a. The script is allowed to execute if the upgrade status object 22a is set to False.

Process 200 determines if the DPA upgrade object 26b is not corrupted (252) and determines whether the software versions between the DPAs 14a, 14b are the same (254). If the DPA upgrade object 26 is not corrupted and the software versions are the same, process 200 sets the site control field 32a to True from False and allows transfer of site control (264). Thus, the DPA 14a waits until just before the DPA 14b starts its upgrade (i.e., when DPA 14b executes processing block 228 and changes version filed 36b from "n" to "n+1.") to allow transfer of the site control at the production site thereby ensuring that only one DPA 14a, 14b is in control of the production site at a time. The transfer of site control is determined by a leader election protocol such as described, for example, in U.S. Pat. No. 7,840,662.

The process 200 persistently updates fields in the DPA upgrade object 26a (270). For example, the site control field is updated with a "True" and the version field is updated with "n+1."

Figure 3:
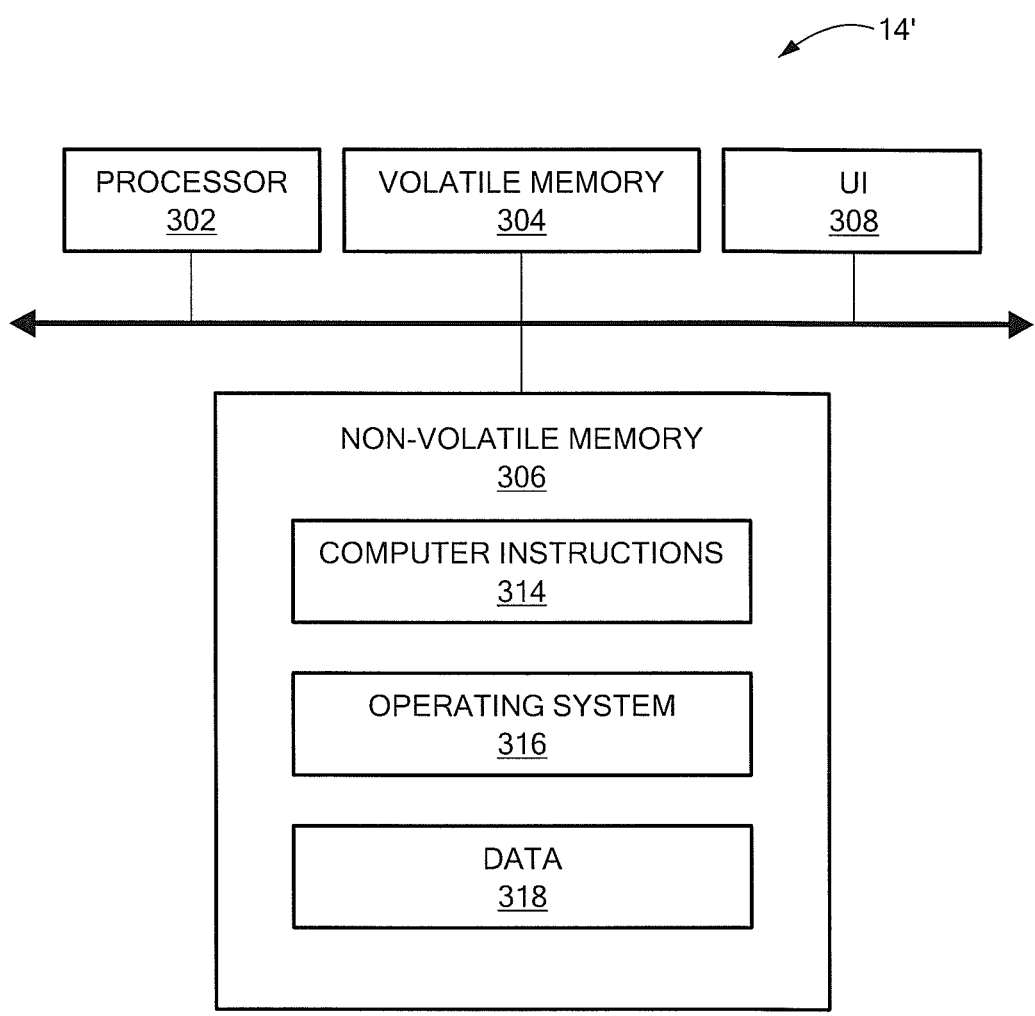
FIG. 3 is an example of a data protection appliance on which the process of FIG. 2 may be implemented.

Referring to FIG. 3, an example of part of the DPAs 14a-14d is a DPA 14'. The DPA 14' includes a processor 302, a volatile memory 304, a non-volatile memory 306 (e.g., hard disk) and a user interface (UI) 308 (e.g., a mouse, a keyboard, a display, touch screen and so forth). The non-volatile memory 306 stores computer instructions 314, an operating system 316 and data 318. In one example, the computer instructions 314 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to upgrade software on a data protection appliance (DPA) in a clustered environment, comprising:
   terminating processes on a first DPA in a first cluster before upgrading the software on the first DPA, the first DPA being used in a data protection system and configured to replicate a first storage volume at a production site to a second storage volume at a replication site, the first cluster being located at the production site and comprising the first and a second DPA, the first DPA and the second DPA connected to the first storage volume and the second storage volume by a network;
   setting a first site control field in a first DPA upgrade object to indicate that the first DPA may not take control of the first cluster, the first DPA upgrade object being stored on the first storage array and associated with the first DPA, the first DPA upgrade object comprising the first site control field and a first version field indicating a version of software on the first DPA;
   upgrading the software on the first DPA to a first version from a second version;
   running the processes on the first DPA after upgrading the software on the first DPA to the first version;
   determining whether the second DPA in the first cluster is about to upgrade to the first version of software by reading a second upgrade status object stored on the second DPA;
   changing the first site control field in the first DPA upgrade object to indicate that the first DPA may take control of the first cluster if the upgrade status object indicates that the second DPA is upgrading to the first version after reading the second upgrade status object stored on the second DPA;
   transferring site control of the first cluster from the second DPA in the first cluster to the first DPA in the first cluster after reading that the first site control field indicates that the first DPA may take control of the first cluster; and
   upgrading the software on the second DPA to the first version of software after the transferring of site control of the first cluster from the second DPA to the first DPA.

2. The method of claim 1, further comprising:
   determining whether the second DPA has the first version of software by reading a version field in a second DPA upgrade object stored on the first storage array, the second DPA upgrade object comprising a second site control field and the second version field; and
   putting the first DPA to sleep if the second DPA has the first version of software for a predetermined amount of time.

3. An article comprising:
   a non-transitory machine-readable medium that stores executable instructions to upgrade software on nodes in a clustered environment, the instructions causing a machine to:
   terminate processes on a first DPA in a first cluster before upgrading the software on the first DPA, the first DPA being used in a data protection system and configured to replicate a first storage volume at a production site to a second storage volume at a replication site, the first cluster being located at the production site and comprising the first and a second DPA, the first DPA and the second DPA connected to the first storage volume and the second storage volume by a network;
   set a first site control field in a first DPA upgrade object to indicate that the first DPA may not take control of the first cluster, the first DPA upgrade object being stored on the first storage array and associated with the first DPA, the first DPA upgrade object comprising the first site control field and a first version field indicating a version of software on the first DPA;
   upgrade the software on the first DPA to a first version from a second version;
   run the processes on the first DPA after upgrading the software on the first DPA to the first version;
   determine whether the second DPA in the first cluster is about to upgrade to the first version of software by reading a second upgrade status object stored on the second DPA;
   change the first site control field in the first DPA upgrade object to indicate that the first DPA may take control of the first cluster if the upgrade status object indicates that the second DPA is upgrading to the first version after reading the second upgrade status object stored on the second DPA;
   transfer site control of the first cluster from the second DPA in the first cluster to the first DPA in the first cluster after reading that the first site control field indicates that the first DPA may take control of the first cluster; and
   upgrade the software on the second DPA to the first version of software after the transferring of site control of the first cluster from the second DPA to the first DPA.

4. The article of claim 3, further comprising instructions causing the machine to:
   determine whether the second DPA has the first version of software by reading a version field in a second DPA upgrade object stored on the first storage array, the second DPA upgrade object comprising a second site control field and the second version field; and put the first DPA to sleep if the second DPA has the first version of software for a predetermined amount of time.

5. A first data protection appliance (DPA) in a first cluster comprising:
circuitry configured to:
terminate processes on the first DPA in the first cluster before upgrading the software on the first DPA, the first DPA being used in a data protection system and configured to replicate a first storage volume at a production site to a second storage volume at a replication site, the first cluster being located at the production site and comprising the first and a second DPA, the first DPA and the second DPA connected to the first storage volume and the second storage volume by a network;

set a first site control field in a first DPA upgrade object to indicate that the first DPA may not take control of the first cluster, the first DPA upgrade object being stored on the first storage array and associated with the first DPA, the first DPA upgrade object comprising the first site control field and a first version field indicating a version of software on the first DPA;

upgrade the software on the first DPA to a first version from a second version;

run the processes on the first DPA after upgrading the software on the first DPA to the first version;

determine whether the second DPA in the first cluster is about to upgrade to the first version of software by reading a second upgrade status object stored on the second DPA change the first site control field in the first DPA upgrade object to indicate that the first DPA may take control of the first cluster if the upgrade status object indicates that the second DPA is upgrading to the first version after reading the second upgrade status object stored on the second DPA;

transfer site control of the first cluster from the second DPA in the first cluster to the first DPA in the first cluster after reading that the first site control field indicates that the first DPA may take control of the first cluster; and upgrade the software on the second DPA to the first version of software after the transferring of site control of the first cluster from the second DPA to the first DPA.

6. The first node of claim 5 wherein the circuitry comprises at least one of a processor, a memory, programmable logic and logic gates.

7. The first DPA of claim 5, further comprising circuitry to:
determine whether the second DPA has the first version of software by reading a version field in a second DPA upgrade object stored on the first storage array, the second DPA upgrade object comprising a second site control field and the second version field; and put the first DPA to sleep if the second DPA has the first version of software for a predetermined amount of time.

8. The method of claim 1, further comprising after terminating the processes on the first DPA, setting a first upgrade status object stored on the first DPA to indicate that an upgrade of the software on the first DPA is occurring.

9. The method of claim 8, further comprising upgrading the software on the first DPA to the first version, setting the first upgrade status object stored on the first DPA to indicate that an upgrade of the software on the first DPA is not occurring.

10. The method of claim 1, further comprising:
terminating processes on a third DPA in a second cluster before upgrading the software on the third DPA, the second cluster being located at the replication site and comprising the third and a fourth DPA, the third DPA and the fourth DPA connected to the second storage array and the second storage array by a network;

upgrading the software on the third DPA to a first version from a second version;

setting a third site control field in a third DPA upgrade object to indicate that the third DPA cannot take control of the second cluster, the third DPA upgrade object being stored on the second storage array and associated with the third DPA, the third DPA upgrade object comprising the third site control field and a third version field indicating a version of software on the third DPA;

running the processes on the third DPA after upgrading the software on the third DPA to the first version;

determining whether the second DPA in the second cluster is about to upgrade to the first version of software by reading an upgrade status object stored on the second DPA;

changing the third site control field in the third DPA upgrade object to indicate that the third DPA may take control of the second cluster if the upgrade status object indicates that the fourth DPA is upgrading to the first version after reading the upgrade status object stored on the fourth DPA;

allowing transfer of site control of the second cluster from the fourth DPA in the second cluster to the third DPA in the second cluster after reading that the third site control field indicates that the third DPA may take control of the second cluster; and upgrading the software on the second DPA to the first version of software after the transferring of site control of the second cluster from the fourth DPA to the third DPA.

11. The article of claim 3, further comprising instructions causing the machine to:
after terminating the processes on the first DPA, set a first upgrade status object stored on the first DPA to indicate that an upgrade of the software on the first DPA is occurring.

12. The article of claim 11, further comprising instructions causing the machine to:
upgrade the software on the first DPA to the first version, setting the first upgrade status object stored on the first DPA to indicate that an upgrade of the software on the first DPA is not occurring.

13. The article of claim 3, further comprising instructions causing the machine to:
terminate processes on a third DPA in a second cluster before upgrading the software on the third DPA, the second cluster being located at the replication site and comprising the third and a fourth DPA, the third DPA and the fourth DPA connected to the second storage array and the second storage array by a network;

upgrade the software on the third DPA to a first version from a second version;

setting a third site control field in a third DPA upgrade object to indicate that the third DPA cannot take control of the second cluster, the third DPA upgrade object being stored on the second storage array and associated with the third DPA, the third DPA upgrade object comprising the third site control field and a third version field indicating a version of software on the third DPA;

run the processes on the third DPA after upgrading the software on the third DPA to the first version;

determine whether the second DPA in the second cluster is about to upgrade to the first version of software by reading an upgrade status object stored on the second DPA;

change the third site control field in the third DPA upgrade object to indicate that the third DPA may take control of the second cluster if the upgrade status object indicates that the fourth DPA is upgrading to the first version after reading the upgrade status object stored on the fourth DPA; and allow transfer of site control of the second cluster from the fourth DPA in the second cluster to the third DPA in the second cluster after reading that the third site control field indicates that the third DPA may take control of the second cluster; and upgrade the software on the second DPA to the first version of software after the transferring of site control of the second cluster from the fourth DPA to the third DPA.

14. The first DPA of claim 5, further comprising circuitry to:

after terminating the processes on the first DPA, set a first upgrade status object stored on the first DPA to indicate that an upgrade of the software on the first DPA is occurring.

15. The first DPA of claim 14, further comprising circuitry to:

upgrade the software on the first DPA to the first version, setting the first upgrade status object stored on the first DPA to indicate that an upgrade of the software on the first DPA is not occurring.

16. The first DPA of claim 5, further comprising circuitry to:

terminate processes on a third DPA in a second cluster before upgrading the software on the third DPA, the second cluster being located at the replication site and comprising the third and a fourth DPA, the third DPA and the fourth DPA connected to the second storage array and the second storage array by a network;

upgrade the software on the third DPA to a first version from a second version;

setting a third site control field in a third DPA upgrade object to indicate that the third DPA cannot take control of the second cluster, the third DPA upgrade object being stored on the second storage array and associated with the third DPA, the third DPA upgrade object comprising the third site control field and a third version field indicating a version of software on the third DPA;

run the processes on the third DPA after upgrading the software on the third DPA to the first version;

determine whether the second DPA in the second cluster is about to upgrade to the first version of software by reading an upgrade status object stored on the second DPA;

change the third site control field in the third DPA upgrade object to indicate that the third DPA may take control of the second cluster if the upgrade status object indicates that the fourth DPA is upgrading to the first version after reading the upgrade status object stored on the fourth DPA; and allow transfer of site control of the second cluster from the fourth DPA in the second cluster to the third DPA in the second cluster after reading that the third site control field indicates that the third DPA may take control of the second cluster; and upgrade the software on the second DPA to the first version of software after the transferring of site control of the second cluster from the fourth DPA to the third DPA.

* * * * *